(12) United States Patent
Lezdey

(10) Patent No.: US 8,084,132 B1
(45) Date of Patent: *Dec. 27, 2011

(54) ANTIMICROBIAL COATINGS

(75) Inventor: John Lezdey, Indian Rocks Beach, FL (US)

(73) Assignee: World Pharmaceutical Trust, Largo, FL (US)

( * ) Notice: Subject to any disclaimer, the term of this patent is extended or adjusted under 35 U.S.C. 154(b) by 1070 days.

This patent is subject to a terminal disclaimer.

(21) Appl. No.: 11/888,717

(22) Filed: Aug. 2, 2007

(51) Int. Cl.
*B32B 27/40* (2006.01)
*C04B 9/02* (2006.01)
*C08I 67/02* (2006.01)

(52) U.S. Cl. ............... 428/423.1; 428/424.2; 428/425.1; 106/14.27; 525/32

(58) Field of Classification Search ............... 428/424.2, 428/425.1, 423.1; 106/14.27, 14.35; 525/32
See application file for complete search history.

(56) References Cited

U.S. PATENT DOCUMENTS

| | | | | |
|---|---|---|---|---|
| 5,508,340 | A * | 4/1996 | Hart | 524/591 |
| 5,693,703 | A * | 12/1997 | Hart | 524/502 |
| 6,585,989 | B2 * | 7/2003 | Herbst et al. | 424/404 |
| 2006/0293205 | A1 * | 12/2006 | Chung | 510/383 |
| 2007/0231295 | A1 * | 10/2007 | Hoppe et al. | 424/78.09 |

* cited by examiner

*Primary Examiner* — Thao T. Tran
(74) *Attorney, Agent, or Firm* — John Lezday

(57) ABSTRACT

There is provided a two component polyurethane coating system which contains anti-microbial complexes consisting of phenol complexes which provide anti-microbial characteristics to the coating system and improved abrasion resistance. There is also provided substrates coated with the antimicrobial coatings.

8 Claims, No Drawings

ANTIMICROBIAL COATINGS

FIELD OF THE INVENTION

The present invention provides a novel coating containing antimicrobial phenolic complexes having improved adherence on hard surfaces, wood and plastic surfaces. More particularly there is provided polyurethane coating compositions containing phenolic complexes which are anti-microbial, anti-fungal, and anti-mold that are crosslinked into the polyurethanes.

BACKGROUND OF THE INVENTION

Polyvinyl sheets have found to be useful as flooring for homes, fencing and as wallboard in homes. Unfortunately polyvinyl is a good substrate for growth of mold and fungus.

The interiors of refrigerators also provide a good environment for growth of mold and fungus because of the humidity therein.

Greenhouses provide an exceptional environment for mold and fungus which requires constant monitoring to prevent contamination of plants.

Additives to or polyurethane coatings generally result in a loss of clarity or haze. Moreover, many anti-microbial compositions interfere with the formation of polyurethane coatings so that there is a loss of strength.

U.S. Pat. Nos. 5,508,340 and 5,693,703 to Hart, which are herein incorporated by reference, relate to aqueous polyurethanes in which the antimicrobial compositions can be incorporated.

SUMMARY OF THE INVENTION

In accordance with the present invention a two component polyurethane coating composition has incorporated therein about 2 to 15% based on actives of an anti-microbial composition comprising:
  about 5 to 16% by weight of a phenol compound;
  about 5 to 10% by weight of an amine or diamine;
  about 5 to 10% by weight of a dicarboxylic acid;
  about 20-40% of a polyester polyol; and
  water.

Advantageously, phenol and o-phenylphenol comprise the phenolic compound.

Advantageously, the dicarboxylic acid is similar to the dicarboxylic acid used in the formation of the polyurethane and amine or diamine is similar to the ones also used.

The invention therefore contemplates that the antimicrobial composition is prepared separately or in situ with the coating composition.

It is an object of the invention to provide an antimicrobial two component polyurethane protective coating.

It is a further object of the invention to provide a two component polyurethane coating having improved abrasion resistance.

DESCRIPTION OF THE PREFERRED EMBODIMENTS

According to the present invention, polyurethane coating compositions can be imparted antimicrobial activity which includes anti-fungal and anti-mold properties by incorporating into the composition an antimicrobial composition comprising:
  about 5 to 1% by weight of an anti-microbial phenol compound;
  about 5 to 10% by weight of an anti-microbial amine or diamine;
  about 5 to 10% by weight of a dicarboxylic acid;
  about 20 to 40% by weight of a polyester polyol; and
  water.

The anti-microbial composition and the coating composition can be prepared separately or are formed with the ingredients of the polyurethane composition.

The coating composition according to U.S. Pat. No. 5,693,703 may be obtained by means of a two component solvent free system. The first component is formed by admixing two components in an aqueous phase. The first component is a polyol phase selected from the group consisting of an acidic polyol, an acidic polyol polymer, a blend of a non-acidic polyol and an acidic polyol, a blend of a non-acidic polyol and an acidic polyol polymer and a blend of a non-acidic polyol polymer and a acidic polyol polymer and mixtures of these combinations. The second component is an aqueous amine phase. The polyol phase can be a single component or blend of various monomeric and polymeric polyol components with the only limitation being that the polyol phase has an average hydroxyl functionality of at least 1.5 and an acid number of between about 15 and 200. The amine phase can be a single amine or blend of amines containing active hydrogens reactive with NCO groups such that the average active hydrogen functionality of the amine or amine blend is at least 1. or greater. The amine or amine blend is present in a quantity sufficient to substantially neutralize the acid number of the polyol phase.

The polyol can be a variety of components or blend of components providing the stated criteria are met. For example the polyol can be acid functionalized by containing a member selected from the group consisting of a polyester diol containing an acid group, a reaction product or a polyhydric polyether and a dicarboxylic acid or anhydride thereof and a reaction product of an ethylenically unsaturated acid, an ethylenically unsaturated alcohol and an ethylenically unsaturated ester.

Preferred acidic polyols are polyester diols containing an acid grou wherein the acid functionality can be either a carboxylic or sulfonic acid. Various combinations can be formulated to provide polyester diols. For example members selected from the group consisting of (a) the reaction product of a dihydric polyol, a trihydric polyol and a dicarboxylic acid and anhydrides thereof; (b) the reaction product of a dihydric polyol, a dicarboxylic acid and a tricarboxylic acid and anhydrides thereof; (c) the reaction product of a polyhydric alcohol and a dicarboxylic acid or anhydride thereof and (d) polyols containing pendant tribasic aromatic acid functionalities such as those resulting from the esterification of dicarboxy benzene sulfonic acids. Surprisingly the dicarboxylic acid also reacts with the phenol to become a crosslinking agent for the polyurethanes.

The acidic polyol can be a single component or can be present as blends of acidic polyols provided the polyol phase has an acid number of between about 15 and 200.

Preferably the polyol will be a blend of acidic polyols and other members selected from the group consisting of a monomeric polyol selected from the group consisting of diols, triols, higher polyfunctional alcohols, oxyalcohols and mixtures thereof and a polymeric polyol selected from the group consisting of polyester polyols, polyether polyols, polyamide polyols, polyesteramide polyols, polycaprolactone polyols and acrylic interpolymer polyols and mixtures thereof and mixtures or blends of monomeric and polymeric polyols.

The overall polyol phase will have a hydroxyl functionality of at least 1.5 and an acid number of between about 15 and 200.

Any variety of amines or blend of amines can be utilized with the proviso that such must contain active hydrogens reactive with NCO groups such that the average active hydrogen functionality of the overall amine or blend of amines is at least 1.5 or greater and the amines being present in a quantity sufficient to substantially neutralize the acidic functionality of the polyol. Preferred are the amines which are anti-microbial.

Suitable amine or blend of amines may comprise a member selected from the group consisting of primary and secondary aliphatic, cycloaliphatic and aromatic amines; tertiary aliphatic amines; alkanol amines, dialkanol amines, trialkanol amines; polyamines selected from the group consisting if aliphatic, alicyclic and aromatic diamines, diamines and tetraamines; oxyalkyleneamines, poly(alkylene)diamines and poly(oxyalkylene)triamines and mixtures thereof. When a tertiary amine is present which does not contain an active hydrogen, the overall amine phase must still meet the active hydrogen functionality of at least 1.5.

The following exemplary of amines which may be utilized for the coating composition but is not intended to be an exhaustive listing.

Representative of primary amines are $C_1$ through $C_{12}$ amines such as methylamine, ethylamine, propylamine, isopropylamine, 1,3-dimethylbutylamine, 3,3-dimethylbutylamine, 1-methylbutylamine, 2-methylbutylamine, 2-ethylbutylamine, isoamylamine, hexylamine, 1,5-dimethylhexylamine, 1-2-dimethylpropylamine, nonylamine, dodecylamine, cyclohexylamine, p-aminophenol and aniline.

Representative of secondary amines are diethylamine, dipropylamine, diisopropylamine, dibutylamine, diisobutylamine, N-methylethylamine. N-methylbutylamine, N-ethylbutylamine, N-methylcyclohexylamine, N-methylaniline.

Suitable diamines may include ethylenediamine, adogen 572, hexamethylenediamine, 1,4-diaminobutane, 1,3-diaminopropane, 1,2-diaminopropane, 1,3-diaminopentane, 1,5-diamihopentane, 2-methylpentamethylenediamine, 1,7-diaminoheptane, 1,8-diaminooctane, 1,9-diaminononane, 1,10-diaminodecane, 1,12-diaminododecane, 1,3-diamino-2-hydroxypropane, 1,2-diamino-2-methylpropane, 3-(dibutylamine)propylamine, N-isopropylethylenediamine, N,N-dimethyl-N'-ethylenediamine, N,N,-dimethyl-1,6-hexanediamine, 2,5-dimethyl-2,5-hexanediamine, N-methylethylenediamine, N-methyl-1,3-propanediamine, N,N'-bis(2-aminoethyl)-1,3-propanediamine, N,N'-bis(3-aminopropyl)-1,3-propanediamine, isophorone diamine, propane-2,2-cyclohexyl amine, o-phenylene diamine, p-aminodiphenylamine, p-tolylene diamine, N,N'-dimethyl-o-phenylene diamine and N,N'-di-p-tolyl-m-phenylene diamine.

Preferred are the amines which are anti-mold and/or anti-microbial which also react with the phenol to become a crosslinking agent.

The antimicrobial coating compositions can be used on any substrate which is susceptible to attach by mold or mildew. For examples, polyvinyl fences, shingles, refrigerator interiors, boats, wood panels and the like that are susceptible to moisture and mold.

The coating of the invention can be used as a protection against colonization of microbes such as hospital walls and floors, showers, medical apparatus, and the like.

Since the coatings are breathable they can be used to cover limbs of cut trees to protect against mold, mildew and insects.

It is advantageous in special cases to use a primer prior to applying the coating composition. High density polyolefins generally have poor adhesion. Consequently primers such as PRIMACOAT of Dupont corporation or Adhesion Promoter 4298 of 3M Corporation can be used.

A preferred antimicrobial composition which can be used with the ingredients in the formation of the polyurethane comprises;

about 3 to 10% by weight phenol;
about 3 to 10% by weight ortho phenylphenol; and
polyol.

The dicarboxylic acid and the diamine are generally part of the formulation for the polyurethane. The polyol is also the solvent used in the formation of the polyurethane.

Example 1

Preparation of Antimicrobial

A. The following ingredients were admixed:

| Ingredient | Amount Wt. % |
|---|---|
| Phenol | 7.5 |
| O-phenylphenol | 7.5 |
| Adogen 572 | 3.8 |
| Succinic acid | 3.8 |
| Polyol | qs. |

B. An antimicrobial composition which utilizes the amine and polycarboxylic acid in preparation of the polyurethane is prepared by admixing the following:

| Ingredient | Amount Wt. % |
|---|---|
| Phenol | 7.5 |
| O-phenylphenol | 7.5 |
| Polyol | qs. |

Example 2

An acidic polyester-polyol which is a hexanediol neopentyl glycol adipate partially reacted with trimellitic anhydride was utilized. It has an average molecular weight of about 1500 contains both carboxylic acid and hydroxyl sites. This polyol has an equivalent weight of about 1250, an acid value of about 50, a hydroxyl value of about 66 and a ratio of hydroxyl/acid functionality of about 1.8:1.3 of about 2,700 cps.

Fifty grams of the Polyol was diluted with 50 mls of water to form a 50/50 by weight polyol/water blend. To this blend was added about 6 grams of triethanolamine having an equivalent weight of 149. The equivalent acid:amine ratio was 1:1 to provide sufficient amine to neutralize the acid function of the polyol.

To the polyol/amine blend was added 40 grams of 100% solids isocyanurate trimer of hexamethylene diisocyanate having an equivalent weight of about 181, thereby supplying sufficient NCO equivalents to provide an NCO/active hydrogen ratio of about 1.2:1. To the mixture was added the composition of Example 1A in an amount to provide 10% of active ingredients. The resulting mixture was an aqueous polyurethane dispersion having a pot life in excess of two hours.

Example 3

An aqueous polyol blend was made by combining 29 parts by weight of Polyol A, 25 parts by weight of a nonacidic polyester-polyol (King K-Flex 188) having an equivalent weight of 238, 1 part by weight of an amine blend (Amine A) made up of 50% diethanol amine, 10% MDP and 40% AMP, 1.3 parts by weight of 28% ammonium hydroxide, 5 parts by weight trimethylol propane (TMP), 0.5 parts by weight of an polyoxypropylenetriamine having a molecular weight of about 3000 (Jeffamine 3000), 36.2 parts by weight water, 1.0 part by weight of a UV stabilizer mixture (CIBA TINUVIN 292 and 1130) and 1.0 part by weight of a surfactant/defoamer mixture (Byk 346 Surfactant, Deefo defoamer). This blend had an acid equivalence of 0.023, and amine equivalence of 0.026 so that there was a slight excess of amine. To the mixture was added the composition of Example 1B in an amount to provide 10% active biocide.

Example 4

An aqueous polyol blend was made by combining 26.4 parts by weight of Polyol, 13 parts by weight of a nonacidic aromatic polyester-diol (Stephan 4000) having an equivalent weight of 140, 1.5 parts by weight of an amine blend made up of 35% triethanol amine, 10% diethanol amine, 25% 1,3-pentanediamine and 30% AMP, 0.8 parts by weight of 28% ammonium hydroxide, 11 parts by weight trimethylol propane (TMP), 4.4 parts by weight of an polyoxypropylenetriamine having a molecular weight of about 3000 (Jeffamine 3000), 41.73 parts by weight water, 1.15 parts by weight of a surfactant/defoamer mixture (Byk 364 Surfactant, DF574) and 0.02 parts by weight of a tin catalyst [T12 (DBTDL)], 5 parts by weight of phenol and 5 parts by weight of O-phenylphenol.

What is claimed is:

1. In a water based polyurethane coating system, the improvement which comprises incorporating into said system antimicrobial phenolic complexes in an amount of about 2 to 10% by weight, said phenolic complexes comprising the reaction products of a member of the group consisting of phenol and O-phenyl phenol with a member of the group consisting of succinic acid and an antimicrobial diamine.

2. The coating system of claim 1 wherein the coating system comprises a member selected from the group consisting of polyurethane and polyurethane-polyurea.

3. The coating system of claim 2 in which the polyurethane is crosslinked.

4. The coating system of claim 1 wherein the antimicrobial complexes are formed in situ.

5. The coating system of claim 1 wherein an antimicrobial composition is prepared separately and then added to a two component polyurethane coating system.

6. A substrate coated with the coating of claim 1.

7. The substrate of claim 6 comprising a polyolefin.

8. The substrate according to claim 6 comprising wood.

* * * * *